April 20, 1965　　　　P. A. WEBER　　　　3,179,896
CALIBRATION APPARATUS FOR UTILIZATION DEVICE
HAVING AMPLIFIER INPUT
Filed May 29, 1961
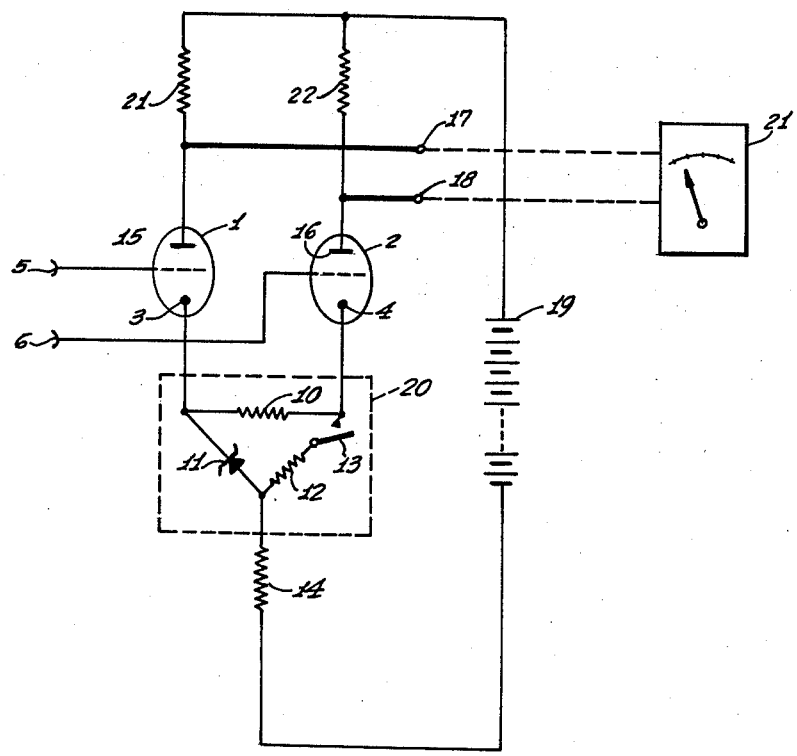
INVENTOR:
Paul Weber
By Robert C. Abelson
Agent

United States Patent Office 3,179,896
Patented Apr. 20, 1965

3,179,896
CALIBRATION APPARATUS FOR UTILIZATION
DEVICE HAVING AMPLIFIER INPUT
Paul Adolf Weber, Freiburg im Breisgau, Germany, assignor to Fritz Hellige & Co., G.m.b.H., Freiburg, Germany
Filed May 29, 1961, Ser. No. 113,400
Claims priority, application Germany, June 1, 1960,
H 39,573
7 Claims. (Cl. 330—69)

The present invention relates to an amplifier for meters and recorders and more particularly to a differential amplifier including means for calibrating the response of a meter or recorder coupled thereto.

Equipment for the continuous measurement or recording of biological voltages such as electrocardiographs and electroencephalographs has come into general use in recent years. The potential of such voltages is generally low and various forms of amplifiers are used to raise the voltage level to a value suitable for direct actuation of the associated meter or recorder. In order to establish the value of an applied input signal corresponding to a particular meter or recorder deflection, it is necessary to calibrate the equipment at the beginning and frequently during a measurement. While a number of circuits for determining the sensitivity of such equipment are known in the art, such circuits have generally been complex and frequently require disconnection of the equipment from the subject to be observed during calibration. It is obvious that the use of such equipment during a scheduled observation would seriously interfere with the continuity of the observation. The circuits of the prior art have frequently made use of chemical voltage reference cells which are both bulky and inconvenient to use except under ideal laboratory conditions.

The present invention overcomes the above and other disadvantages of circuits heretofore known in the art by providing a calibration circuit which may be used with a meter or recorder including an amplifier and means for applying a fixed calibration voltage to the amplifier in order to establish a corresponding observable deflection on the meter. The circuit is simple and reliable, and application of the calibration voltage may be accomplished without interfering with the normal use of the equipment.

The present invention utilizes as a voltage reference element a zener diode operating in its reversed voltage reference range. As is well known, such diodes, which are semi-conductors, display a substantially constant drop of potential over a portion of their reverse bias range, such potential being known as the zener voltage. Such diodes display a comparatively low resistance of about 10 ohms in such region. Depending upon the type of construction of the zener diode, the zener voltage may have value of between 5 to 10 volts, the zener voltage being practically independent of the value of current through the diode and remaining substantially time invariant. While the present invention is described in terms of the use of a zener diode, it will readily be appreciated that similar devices displaying comparable characteristics may be substituted therefor without departing from the scope of the present invention. The use of a zener diode and its manner of connection give the calibration circuit of the present invention a long term stability heretofore unknown in the art.

It is therefore an object of the present invention to provide a calibration circuit for use with a meter or recorder which provides a constant reference potential to the amplifier during calibration, producing a corresponding deflection of the meter or recorder.

A further object of the present invention is to provide an amplifier including means for calibrating a meter or recorder connected thereto wherein the calibration can be carried out during the application of input signals to the amplifier without interfering with the response of the amplifier and the meter or recorder to signals under observation.

Another object of the present invention is to provide a calibration circuit for use with a meter or recorder which is relatively simple to construct, convenient to operate, and is both accurate and reliable.

An electrical measuring instrument according to the present invention comprises an amplifier including a first and a second triode vacuum tube and a calibration circuit including a zener diode connected between the cathodes of the two amplifier tubes. Opening and closing of a switch inserts or removes a calibration voltage derived from the zener diode from the cathode providing a pre-established calibration voltage which appears at the output of the amplifier.

The novel features which are believed to be characteristic of the invention, both as to its organization and method of operation, together with further objects and advantages thereof, will be better undersood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

As shown in the figure, an electrical measuring instrument according to the present invention comprises an amplifier including first and second triode vacuum tubes 1 and 2 each including a grid, cathode and plate interconnected as a differential amplifier. The plates 15 and 16 respectively of each of triodes 1 and 2 are connected to a source of direct current 19 through plate load resistors 21 and 22 respectively, while the cathodes 3 and 4 of each of triodes 1 and 2 are connected through calibration circuit 20 and a resistor 14 to the remaining terminal of voltage source 19. Input signals for the amplifier may be applied to the grid circuits of each of the triodes at input terminals 5 and 6 while an output signal representing the difference of potential between input terminals 5 and 6 may be taken from output terminals 17 and 18 connected to each of plates 15 and 16 respectively.

In order to suppress common mode signals and to provide appropriate coupling between triodes 1 and 2, resistor 14 should be of relatively high resistance, so that substantially constant current flows therethrough. Alternatively, in accordance with well-known differential amplifier practice, suitably arranged vacuum tube or transistor circuits may be substituted for resistor 14 to enhance the performance of the amplifier circuit thus far described.

The output signal from terminals 17 and 18 may be applied directly or through further amplifier stages (not shown) to a meter 21, the signal appearing on the meter being an indication of the potentials applied to terminals 5 and 6 and the potentials developed in the calibration circuit 20 as will now be described.

Calibration circuit 20 essentially comprises a circuit for introducing and removing a fixed known potential difference, independent of the signals applied to inputs 5 and 6, between the cathodes 3 and 4 of triodes 1 and 2, thereby causing a corresponding calibration signal to appear at terminals 17 and 18 of the amplifier stage.

As shown in the figure, calibration circuit 20 includes a resistor 10 of relatively low resistance connected between cathodes 3 and 4 and a zener diode 11 connected between cathode 3 and resistor 14. A resistor 12 of relatively high resistance is arranged to provide a serial conducting path through a single-pole, single-throw switch 13 between cathode 4 and resistor 14. Zener diode 11 should be arranged in the circuit so as to be polarized by current source 19 in its reversed bias or regulating direction and the currents flowing through it should be such that the diode conducts within its regulating range.

Considering now the operation of the circuit thus described, with switch 13 open a potential drop corresponding to its regulating voltage will appear across zener diode 11, but cathodes 3 and 4 will have almost identical potentials, since the voltage drop across resistor 10 which may have a resistance of about 10 ohms, will be relatively insignificant. If the switch 13 is closed, however, then the resistors 10 and 12 form a voltage divider across zener diode 11 and the voltage appearing at cathode 4 will be lowered with respect to the voltage at cathode 3. This voltage difference will be a fraction of the zener voltage appearing across diode 11, and will substantially correspond to the zener regulating voltage times the ratio of the resistance of resistor 10 to the resistance of resistor 12. Through suitable selection of the values of these two resistors, it will readily be recognized that it is possible to introduce a voltage difference corresponding to any desired fraction of the zener voltage. For example, a calibration voltage of one millivolt may be introduced if a zener diode 11 with a zener voltage of 6 volts is used, and resistor 10 has a value of 10 ohms and resistor 12 a value of 60,000 ohms. Since zener diode 11 is of substantially low resistance in its regulating range, it will be unaffected.

Introduction of the calibration voltage between the cathodes 3 and 4 through the operation of switch 13 will be recognized to be effectively equivalent to the application of the same voltage between the input terminals 5 and 6, and accordingly will result in the production of a corresponding amplified signal between terminals 17 and 18 and at the meter 21 coupled thereto. However, it is to be noted that this calibration voltage may be inserted or removed by the simple operation of the switch without altering the connections of the circuit in any way. At the same time the calibration voltage is independent of the input circuit provided by terminals 5 and 6 and, accordingly, may be applied or removed regardless of the signal condition present in these input terminals. Similarly, the presence of the calibration circuit does not introduce external potentials which might be returned through terminals 5 and 6 to the subject under observation with attendant deleterious effects. It will also be readily recognized that operation of switch 13 does not affect the current flowing in zener diode 11 and, accordingly, the conditions of operation of the diode are not altered through operation of the switch, the calibration voltage being independent of any current or voltage differences appearing elsewhere in the circuit. Calibration also may be accomplished either before or during the application of input signals to be observed to input terminals 5 and 6, appearing for example in the case of a record trace as a readily distinguishable step in the trace.

It will be noted that introduction of the calibrating circuit 20 into the circuit does not, regardless of the position of switch 13, affect the common mode suppression characteristics of the circuit attributable to the presence of high resistance resistor 14 and thus does not affect the performance of the differential amplifier insofar as its amplifying properties are concerned. The fact that the input circuits 5 and 6 and the circuit 20 are floating with respect to ground also renders the calibration circuit completely independent of grounding conditions present in the equipment in use, thereby isolating the calibrating circuit from noisy ground currents.

While the present invention has been described in connection with the use of triode electron tubes, it will readily be recognized that more complex tubes or transistors can readily be substituted therefor without departing from the scope and spirit of the present invention. Similarly, any of the well-known current stabilizing circuits may be substituted for the high value resistor 14 in accordance with prior teachings of the art.

What is claimed as new is:

1. An electrical measuring instrument comprising first and second amplifying stages, each having an input circuit and an output circuit, means for establishing a reference point for the input circuit of each of said amplifying stages, a resistor interconnecting each of said reference points, and calibrating means for alternately establishing and removing a fixed potential across said resistor, said calibrating means including a non-linear semiconductor circuit element having a first and a second electrode, said first electrode being coupled to one of said reference points, said calibrating means further including switching means intercoupling said second electrode and the second of said reference points, said amplifier stages being responsive to the application and removal of said fixed potential to produce a corresponding signal across the output circuits of said amplifying stages which is indicative of the gain of said stages with respect to signals applied across said input circuits.

2. An electrical measuring instrument comprising first and second amplifier stages, each including an amplifying device having input, output, and common elements, means applying input signals to the input elements of each device, and means deriving an output signal from the output element of each device, a common source of current for application between the common and output elements of both devices, and a calibration circuit connected intermediate said common current source and said common elements comprising: means for producing a constant voltage between one of said common elements and said current source, an impedance interconnecting both common elements, and switching means including an additional impedance for selectively connecting the other of said common elements to said current source.

3. An electrical measuring instrument comprising first and second amplifying stages, each including an electron discharge device having a grid, cathode and plate; means for applying an input signal to the grids of each of said stages and means for deriving an output signal from the plates of each of said stages; a common source of plate cathode current for said stages, and a calibration circuit connected intermediate said common current source and said cathodes comprising a voltage reference element interconnecting one of said cathodes and said current source, a resistor interconnecting said cathodes and switch means including a resistor for alternately connecting the other of said cathodes to said current source.

4. The circuit set forth in claim 3 wherein said switch means includes a serial resistor and switch for connecting the other of said cathodes to said current source.

5. The circuit set forth in claim 4 wherein said voltage reference element comprises a zener diode operating in its regulating region, said resistor interconnecting said cathodes is of relatively low resistance, and said serial resistor is of relatively high resistance.

6. A differential amplifier for use with a meter including means for calibrating the sensitivity of the amplifier, said amplifier comprising first and second electron discharge devices, each having a grid, cathode and anode; a source of potential; means for connecting said source of potential to each of said anodes; means for applying input signals to the grids of each of said devices and deriving output signals from the anodes of said devices; a resistance element for connecting said source of potential to the cathodes of said devices through a calibration circuit, said calibration circuit comprising a voltage reference element interconnecting one of said cathodes and said resistance element, a first resistor interconnecting said cathodes and a second resistor and switch for alternately interconnecting the other of said cathodes and said resistance element.

7. The differential amplifier set forth in claim 6 wherein said resistance element comprises a resistor, said voltage reference element comprises a zener diode, and said first resistor has a resistance substantially less than the resistance of said second resistor.

References Cited by the Examiner
UNITED STATES PATENTS 2,660,165 11/53 Miller _____ 324—130 X
2,677,729 5/54 Mayne _____ 330—69

ROY LAKE, Primary Examiner.

BENNETT G. MILLER, Examiner.